United States Patent [19]

Forsberg et al.

[11] Patent Number: 5,260,268

[45] Date of Patent: Nov. 9, 1993

[54] METHODS OF DRILLING WELL BOREHOLES AND COMPOSITIONS USED THEREIN

[75] Inventors: John W. Forsberg; Richard W. Jahnke, both of Mentor, Ohio

[73] Assignee: The Lubrizol Corporation, Wickliffe, Ohio

[21] Appl. No.: 39,540

[22] Filed: Mar. 29, 1993

Related U.S. Application Data

[63] Continuation of Ser. No. 732,276, Jul. 18, 1991, abandoned.

[51] Int. Cl.$^5$ ............................................. C09K 7/02
[52] U.S. Cl. ............................ 507/133; 507/136; 507/138; 507/131; 252/8.551; 166/301
[58] Field of Search .................. 507/133; 252/8.551; 166/301

[56] References Cited

U.S. PATENT DOCUMENTS

| | | | |
|---|---|---|---|
| Re. 30,885 | 3/1982 | Rieder | 252/34 |
| Re. 31,522 | 2/1984 | Rieder | 252/34 |
| 2,900,026 | 8/1959 | Trusheim et al. | 166/301 |
| 3,099,624 | 7/1963 | Wilson | 166/301 X |
| 3,126,970 | 3/1964 | Rygg | 166/301 X |
| 3,217,802 | 11/1965 | Reddie et al. | 166/301 |
| 3,236,769 | 2/1966 | Burdyn et al. | 507/133 |
| 3,394,757 | 7/1968 | Fisher | 166/301 X |
| 3,396,105 | 8/1968 | Burdyn et al. | 507/133 |
| 3,806,456 | 5/1974 | Voegl | 252/51.5 |
| 3,979,305 | 9/1976 | Fischer et al. | 507/133 X |
| 3,992,312 | 11/1976 | Genjida et al. | 252/77 |
| 4,107,061 | 8/1978 | Sturwold et al. | 252/49.3 |
| 4,133,803 | 1/1979 | Klein | 528/340 |
| 4,239,635 | 12/1980 | Rieder | 252/34 |
| 4,368,133 | 1/1983 | Forsberg | 252/75 |
| 4,374,741 | 2/1983 | Rieder | 252/34 |
| 4,379,063 | 4/1983 | Williams | 252/33.6 |
| 4,427,564 | 1/1984 | Brownawell et al. | 252/8.551 |
| 4,435,297 | 3/1984 | Forsberg | 252/34.7 |
| 4,436,638 | 3/1984 | Walker et al. | 252/8.551 |
| 4,447,348 | 5/1984 | Forsberg | 252/75 |
| 4,448,703 | 5/1984 | Forsberg | 252/75 |
| 4,464,269 | 8/1984 | Walker et al. | 252/8.551 |
| 4,466,486 | 8/1984 | Walker | 252/8.551 X |
| 4,494,610 | 1/1985 | Walker | 166/301 |
| 4,614,235 | 9/1986 | Keener et al. | 252/8.551 X |
| 4,661,275 | 4/1987 | Forsberg et al. | 252/49.3 |
| 4,664,834 | 5/1987 | Forsberg | 252/77 |
| 4,676,916 | 6/1987 | Crema | 252/8.553 |
| 4,708,753 | 11/1987 | Forsberg | 149/2 |
| 4,738,797 | 4/1988 | Halpern et al. | 252/49.3 |
| 4,760,176 | 7/1988 | Halpern et al. | 562/564 |
| 4,770,803 | 9/1988 | Forsberg | 252/75 |
| 4,795,581 | 1/1989 | Nieh et al. | 252/77 |
| 4,863,534 | 9/1989 | Forsberg | 149/2 |
| 4,882,075 | 11/1989 | Jones | 252/8.553 |
| 4,964,615 | 10/1990 | Mueller et al. | 252/8.551 |

FOREIGN PATENT DOCUMENTS

| | | | |
|---|---|---|---|
| 7580733 | 5/1975 | Australia. | |
| 1201527 | 7/1982 | U.S.S.R. | 252/8.551 |

*Primary Examiner*—Gary Geist
*Attorney, Agent, or Firm*—John H. Engelmann; Frederick D. Hunter; David M. Shold

[57] ABSTRACT

The present invention relates to a method comprising the steps of introducing into a well borehole a composition, comprising water and an amount, sufficient to reduce drilling torque, prevent sticking or twisting of a pipe during drilling, or release a stuck pipe in a well borehole, of (A) at least one reaction product of (A-1) at least one hydrocarbyl-substituted carboxylic acylating agent and (A-2) at least one amine-terminated polyoxyalkylene having a number average molecular weight from about 600 to about 10,000, or at least one salt of the reaction product, and drilling the well borehole. Drilling torque, twisting and sticking of the pipe during drilling and releasing of stuck pipe in a well borehole are all effectively controlled by the methods and compositions of the present invention.

28 Claims, No Drawings

METHODS OF DRILLING WELL BOREHOLES AND COMPOSITIONS USED THEREIN

This is a continuation of copending application(s) Ser. No. 07/732,276 filed on Jul. 18, 1991 now abandoned.

FIELD OF THE INVENTION

The invention relates to a method of drilling a well borehole which encompasses using water-base drilling fluids and spotting fluids. The fluids contain the reaction products of a polycarboxylic acylating agent and an amine-terminated polyoxyalkylene.

INTRODUCTION TO THE INVENTION

The primary functions of a drilling fluid or mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and production.

Sticking of the drill pipe during the drilling is a common problem. This condition is commonly referred to as being a stuck pipe. Spotting fluids or stuck pipe fluids are generally used to free the drill pipe so that drilling may continue. Oil-base drilling fluids are commonly used to prevent stuck pipe. However, these fluids contain refined mineral oils or diesel fuels which adversely effect marine life. It is desirable to have drilling fluids and spotting fluids which are effective and yet do not adversely impact the environment.

Re. 30,885, which is a reissue of U.S. Pat. No. 4,239,635 relates to diamides and lubricants containing the lame. The carboxylic acid terminated acid diamides and alkali metal, ammonium or amine salts thereof have lubricating properties and are especially useful in aqueous metal-working fluids.

Re. 31,522, which is a reissue of U.S. Pat. No. 4,374,741, relates to polyamides and functional fluids containing the same. The polyamides are polyoxylene polyamides having a terminal carboxylic acid group and terminal amine group in the same molecule and the degree of polymerization of 210 and salts thereof are useful in preparing stable aqueous based metal-working and hydraulic fluids.

U.S. Pat. No. 4,107,061 relates to amino-amide lubricants derived from polymeric fatty acids and poly(oxyethylene) diamines. These materials are readily compatible with water in all proportions and form clear, aqueous solutions which have lubricating properties.

U.S. Pat. Nos. 4,661,275 and 4,664,834 relate to hydrocarbyl-substituted succinic acid and/or anhydride/amine-terminated poly(oxyalkylene) reaction products and aqueous systems containing the same. These reaction products are useful as shear-stable thickeners for functional fluids.

U.S. Pat. No. 4,795,581 relates to aqueous fluids thickened with fatty acid modified polyoxyalkylene diamines. These materials are useful for water/glycol based hydraulic fluids, cosmetics and surfactants.

SUMMARY OF THE INVENTION

The present invention relates to a method, comprising the steps of:

introducing into a well borehole a composition, comprising water and an amount, sufficient to reduce drilling torque, prevent sticking or twisting of a pipe during drilling, or release a stuck pipe in a well borehole, of (A) at least one reaction product of (A-1) at least one carboxylic acylating agent and (A-2) at least one amine-terminated polyoxyalkylene having a number average molecular weight from about 600 to about 10,000, or at least one salt of the reaction product, and drilling the well borehole.

Drilling torque, twisting and sticking of the pipe during drilling and releasing of stuck pipe in a well borehole are all effectively controlled by the methods and compositions of the present invention.

DETAILED DESCRIPTION OF THE INVENTION

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon.

The methods and fluids of the present invention use (A) the reaction product of (A-1) a hydrocarbyl-substituted carboxylic acylating agent and (A-2) an amine-terminated polyoxyalkylene having a number average molecular weight of about 600 to about 10,000.

(A-1) carboxylic Acylating Agent

The carboxylic acylating agents (A-1) are carboxylic acylating agents having from about 1 to about 4 carboxylic groups, preferably 2 or 3. The term acylating agents encompasses acids, anhydrides, lower esters ($C_{1-7}$ esters), halides, etc. Preferably, the acylating agents are acids or anhydrides. Carboxylic acylating agents may be monocarboxylic or polycarboxylic acylating agents.

Monocarboxylic acylating agents include fatty carboxylic acylating agents including fatty acids and Diels-Alder monocarboxylic reaction products. Fatty acids generally contain from about 8, preferably from about 10, more preferably from about 12 to about 30, more preferably to about 24 carbon atoms. Examples of fatty acids include stearic, oleic, lauric, linoleic, abietic, palmitic, sebacic, linolenic, behenic, tall oil and rosin acids.

The monocarboxylic acylating agents may also be the reaction product of an $\alpha,\beta$-unsaturated carboxylic acid (e.g., acrylic or methacrylic acid) with one or more olefins. These olefins are preferably alpha-olefins (sometimes referred to as mono-i-olefins) or isomerized alpha-olefins. Examples of the alpha-olefins include 1-octene, octene, 1-nonene, 1-decene, 1-dodecene, 1-tridecene, 1-tetradecene, 1-pentadecene, 1-hexadecene, 1-heptadecene, 1octadecene, 1-nonadecene, 1-eicosene, 1-henicosene, 1-docosene, 1-tetracosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. The $C_{16}$ and $C_{16-18}$ alpha-olefins are particularly preferred.

Isomerized alpha-olefins may also be used to form Diels-Alder reaction products. These olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference.

The polycarboxylic acylating agents of the present invention include dicarboxylic acylating agents such as succinic acylating agents, dimer acylating agents, and Diels-Alder dicarboxylic acylating agents. Tricarboxylic acylating agents include trimer acylating agents and Diels-Alder tricarboxylic acylating agents.

The dimer acylating agents include products resulting from the dimerization of unsaturated fatty acids, e.g., the above-described fatty acids. Generally, the dimer acids have an average from about 18, preferably from about 28 to about 44, prefereably to about 40 carbon atoms. In one embodiment, the dimer acids have preferably about 36 carbon atoms. The dimer acids are preferably prepared from $C_{18}$ fatty acids, such as oleic acids. The dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference. Examples of dimer acids include Empol® 1014 1016 and 1018 Dimer Acid, each available from Emery Industries, Inc. and Hystrene® dimer acids 3675, 3680, 3687 and 3695, available from Humko Chemical.

In another embodiment, the polycarboxylic acylating agents are dicarboxylic acylating agents which are the Diels-Alder type reaction products of an unsaturated fatty acid (e.g., the above-described fatty acids, preferably tall oil acids and oleic acids) with alpha,beta-ethylenically unsaturated carboxylic acylating agent (e.g., acrylic or methacrylic acylating agents) such as are taught in U.S. Pat. No. 2,444,328, the disclosure of which is incorporated herein by reference. These Diels-Alder acylating agents include Westvaco® Diacid H-240, 1525 and 1550, each being commercially available from the Westvaco Corporation.

In another embodiment the polycarboxylic acids or anhydrides are hydrocarbyl-substituted succinic acylating agents, preferably acids or anhydrides, more preferably anhydrides. The hydrocarbyl group generally contains an average from about eight, preferably from about 14, more preferably from about 16 to about 40, preferably to about 30, more preferably to about 24, still more preferably to about 18 carbon atoms. Preferably, the hydrocarbyl group is an alkenyl group. The alkenyl group may be derived from one or more of the above-described olefins.

The succinic acylating agents are prepared by reacting the above-described olefins or isomerized olefins with unsaturated carboxylic acids such as fumaric acids or maleic acid or anhydride at a temperature of about 160° to about 2400° C., preferably about 185° to about 210° C. Free radical initiators (e.g., t-butyl catechol) may be used to reduce or prevent the formation of polymeric byproducts. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535-537. These references are incorporated by reference for their disclosure of procedures for making the above acylating agents.

The polycarboxylic acylating agent may also be a tricarboxylic acylating agent. Examples of tricarboxylic acylating agents include trimer and Diels-Alder tricarboxylic acylating agents. These acylating agents generally contain an average from about 18, preferably from about 30, more preferably from about 36 to about 66, preferably to about 60 carbon atoms. Trimer acids are prepared by the trimerization of the above-described fatty acids. The Diels-Alder tricarboxylic acylating agents are prepared by reacting an unsaturated monocarboxylic acid with a alpha,beta-ethlenically unsaturated dicarboxylic acid (e.g., fumaric acid or maleic acid or anhydride). In one embodiment, the Diels-Alder acylating agent contains an average from about 12, preferably from about 18 to about 40, preferably to about 30 carbon atoms. Examples of these tricarboxylic acids include Empol® 1040 available commercially from Emery Industries, Hystrene® 5460 available commercially from Humko Chemical, and Unidyme® 60 available commercially from Union Camp Corporation.

In another embodiment, the carboxylic acylating agent (A-1) is a mixture containing at least 10% by weight of a carboxylic acylating agent having at least three carboxylic groups. The mixture preferably contains at least 50% by weight, preferably 80% by weight, preferably 90% by weight tricarboxylic acylating agent. The carboxylic acylating agents may be mixtures of the above-identified tricarboxylic acylating agents with monocarboxylic acylating agents and the above-identified dicarboxylic acylating agents. In another embodiment, the mixture may contain mono-, di-, or tricarboxylic acids. The monocarboxylic acids may have from 2, preferably from about 8, more preferably from about 12 to about 30, preferably to about 24 carbon atoms. Examples of monocarboxylic acids include acetic, propionic, butyric and fatty carboxylic acids such as oleic, stearic, linoleic, dodecanoic or tall oil acids.

(A-2) Amine-terminated Polyoxyalkylenes

One or more of the above carboxylic acylating agents are reacted with at least one amine-terminated polyoxyalkylene. The amine-terminated polyoxyalkylenes are preferably alpha-omega amine-terminated polyoxyalkylenes. These amines include alpha-omega diamino polyoxyethylene, alpha-omega diamino polyoxypropylene-polyoxyethylene-polyoxypropylene or alpha-omega diamino propyleneoxide capped polyoxyethylene. The amine-terminated polyoxyalkylenes may also be a urea condensate of such alpha-omega diamino polyoxyalkylenes described above. The amine-terminated polyoxyalkylenes may also be polyamino (e.g., triamino, tetramino, etc.). These compounds generally have a number average molecular weight from about 600, typically from about 2000, preferably from about 3000, more preferably from about 4000 to about 10,000, preferably to about 8000, more preferably to about 7000.

In one embodiment, the diamines are represented by the formula

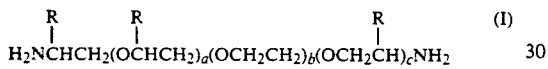

wherein each R is independently hydrogen or an alkyl group having from 1 to about 8 carbon atoms, preferably 1 to about 3, more preferably 1; a is a number in the range of from zero to about 200; b is a number in the range of form about 10 to about 650; and c is a number in the range of from zero to about 200. These diamines preferably have number average molecular weights in the range from about 600, preferably from about 1000, more preferably from about 3000, more preferably from about 4000 to about 10,000, preferably to about 7000. Specific examples of the diamines include Jeffamine ® ED-600 wherein a+c is approximately 2.5 and b is approximately 8.5; Jeffamine ® ED-900 wherein a+c is approximately 2.5 and b is approximately 15.5; Jeffamine ® ED-2001 wherein a+c is approximately 2.5 and b is approximately 40.5; Jeffamine ® ED-4000 wherein a+c is approximately 2.5 and b is approximately 86.0; and ED-6000 wherein a+c is approximately 2.5 and b is approximately 131.5. The numerical value of the Jeffamine ® approximate number average molecular weight. For instance, Jeffamine ® ED-6000 has an approximate number average molecular weight of 6000.

In another embodiment, the amine-terminated polyoxyalkylene is a diamine preferably amine-terminated polypropylene glycols. These diamines are represented by the formula

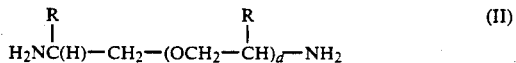

wherein R is defined above, d is from 1 to about 150, preferably 2 to about 100, more preferably 2 to about 75. Examples of these amines include Jeffamine ® D-230 wherein d is about 2–3; Jeffamine ® D-400 wherein d is about 5–6; Jeffamine ® D-2000 wherein d is an average of about 33; and Jeffamine ® D-4000 wherein d is an average of about 68.

In another embodiment, the diamines are represented by the formula

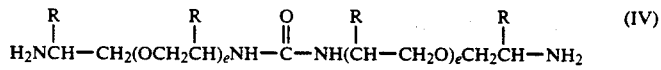

wherein R is defined above; e is a number sufficient to provide said compound with a number average molecular weight of at least about 600. These compounds preferably have number average molecular weights in the range of about 600 to about 2,500, more preferably about 700 to about 2,200.

In one embodiment the amine-terminated polyoxyalkylene is a monoamino polyoxyalkylene such as an amino polyoxypropylene-polyoxyethylene-polyoxypropylene, or an amino polyoxypropylene. These amines are generally prepared by the reaction of a monohydric alcohol with an epoxide, such as styrene oxide, 1,2-butene oxide, ethylene oxide, propylene oxide and the like, more preferably ethylene oxide, propylene oxide or mixtures thereof. The terminal hydroxyl group is then converted to an amino group. These amines are represented by the structure:

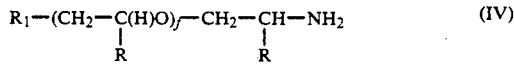

wherein f is 1 to about 150, $R_1$ is an alkoxy group having 1 to about 18 carbon atoms, and each R is defined above. Preferably f is 1 to 100, more preferably about 4 to about 40. $R^1$ is preferably an alkoxy group having from 1 to 12 carbon atoms, more preferably a methoxy group. These types of amines are available from Texaco Chemical Company under the tradename Jeffamine. Specific examples of these amines include Jeffamine ® M-600; M-1000, M-2005 and M-2070 amines.

In another embodiment, the amine-terminated polyoxyalkylene is a triamine prepared by treating a triol with ethylene oxide, propylene oxide, or mixtures thereof, followed by amination of the terminal hydroxyl group. These amines are available commercially from Texaco Chemical Company under the tradename Jeffamine ® triamines. Examples of these amines include, Jeffamine ® T-403, which is trimethylolpropane treated with about 5-6 moles of propylene oxide, Jeffamine ® T-3000, which is glycerine treated with 50 moles of propylene oxide, and Jeffamine ® T-5000, which is glycerine treated with 85 moles of propylene oxide.

The diamines and triamines that are useful in accordance with the present invention are disclosed in U.S. Pat. Nos. 3,021,232; 3,108,011; 4,444,566; and Re. 31,522. The disclosures of these patents are incorporated herein by reference for their disclosure of diamines and triamines and methods of making the same.

The above amine-terminated polyoxyalkylenes are reacted with the above polycarboxylic acylating agents at an equivalent ratio of acylating agent to amine of about (1-4:1), preferably (1-2:1), more preferably (3:2), at 125° C. to 250° C., more preferably about 150° C. to about 225° C. The reaction is usually accomplished within about two to about ten hours, more preferably about two to about six, more preferably about four hours, more preferably between 0.25 to about 2 hours.

The reaction product (A) of (A-1) a carboxylic acylating agent and (A-2) an amine-terminated polyoxyalkylene or salt of the reaction product may be used in the present invention. The salt is a metal salt, ammonium salt or a mixed salt, e.g., ammonium plus metal.

The ammonium salt of the reaction product (A) may be derived from ammonia or any amine. The amine useful in making ammonium salts of amidic acids may be any of the amine-terminated polyoxyalkylenes described above. Further, the amine may be an alkyl monoamine, or a hydroxyamine.

The alkyl monoamines are primary, secondary or tertiary monoamines. The alkyl monoamines generally contain from 1 to about 24 carbon atoms, more preferably 1 to about 12, more preferably 1 to about 6 in each alkyl group. Examples of primary monoamines useful in the present invention include methylamine, ethylamine, propylamine, butylamine, octylamine, and dodecylamine. Examples of secondary monoamines are given above. Tertiary monoamines include trimethylamine, tributylamine, methyldiethylamine, ethyldibutylamine, etc.

In another embodiment the amines are hydroxyamines. Typically, the hydroxyamines are primary, secondary or tertiary alkanol amines or mixtures thereof. Such amines can be represented by the Formulae:

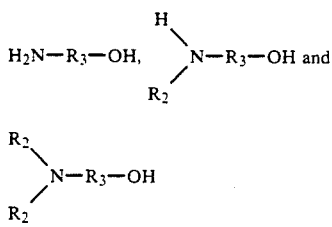

wherein each $R_2$ is independently a hydrocarbyl group of one to about eight carbon atoms or hydroxyhydrocarbyl group of two to about eight carbon atoms and $R_3$ is a divalent hydrocarbyl group of about two to about 18 carbon atoms. The group $—R_3—OH$ in such formulae represents the hydroxyhydrocarbyl group. $R_3$ can be an acyclic, alicyclic or aromatic group. Typically, $R_3$ is an acyclic straight or branched alkylene group such as an ethylene, 1,2-propylene, 1,2-butylene or 1,2-octadecylene group, more preferably an ethylene or propylene group, more preferably an ethylene group. Where two $R_2$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R_2$ is independently a methyl, ethyl, propyl, butyl, pentyl or hexyl group. Examples of these hydroxyamines include monoethanol amine, diethanol amine, triethanol amine, diethylethanol amine, ethylethanol amine, etc.

The hydroxyamines can also be an ether N-(hydroxyhydrocarbyl) amine. These are hydroxypoly (hydrocarbyloxy) analogs of the above-described hydroxyamines (these analogs also include hydroxyl-substituted oxyalkylene analogs). Such N-(hydroxyhydrocarbyl) amines can be conveniently prepared by reaction of epoxides with aforedescribed amines and can be represented by the Formulae:

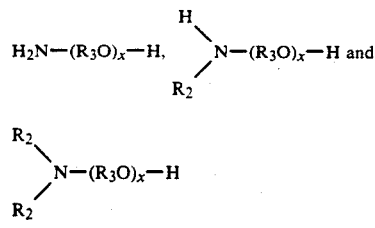

wherein x is a number from about 2 to about 15 and $R_2$ and $R_3$ are as described above. $R_2$ may also be a hydroxypoly(hydrocarbyloxy) group.

In a preferred embodiment, the salts of the amidic acids are formed from hydroxyamines. These hydroxyamines can be represented by the formula

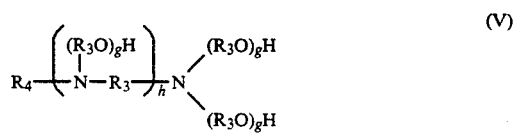

wherein each $R_3$ is an alkylene group; $R_4$ is a hydrocarbyl group; g is independently an integer from zero to 100, provided at least one g is an integer greater than zero; and h is zero or one.

Preferably, $R_4$ is a hydrocarbyl group having from 8 to about 30 carbon atoms, preferably 8 to about 24, more preferably 10 to about 18 carbon atoms. $R_4$ is preferably an alkyl or alkenyl group, more preferably an alkenyl group. $R_4$ is preferably an octyl, decyl, dodecyl, tridecyl, tetradecyl, hexadecyl, octadecyl, oleyl, tallow or soya.

g is preferably one to about 100, more preferably 2 to about 50, more preferably 2 to about 20, more preferably 3 to about 10, more preferably about 5.

$R_3$ is as described above. Preferably, each $R_3$ is independently an ethylene or propylene group.

The above hydroxyamines can be prepared by techniques well known in the art, and many such hydroxyamines are commercially available. They may be prepared, for example, by reaction of primary amines containing at least 6 carbon atoms with various amounts of alkylene oxides such as ethylene oxide, propylene oxide, etc. The primary amines may be single amines or mixtures of amines such as obtained by the hydrolysis of fatty oils such as tallow oils, sperm oils, coconut oils, etc. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

The useful hydroxyamines where h in the above formula (V) is zero include 2-hydroxyethylhexylamine, 2-hydroxyethyloctylamine, 2-hydroxyethylpentadecylamine, 2-hydroxyethyloleylamine, 2-hydroxyethylsoyamine, bis-(2-hydroxyethyl)hexylamine, bis(2-hydroxyethyl)oleylamine, and mixtures thereof. Also included are the comparable members wherein in the above formula at least one a is an integer greater than 2, as for example, 2-hydroxyethoxyethylhexylamine.

A number of hydroxyamines wherein h is zero are available from the Armak Chemical Division of Akzona, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen 0/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallow-amine containing about 2, 5 and 15 moles of ethylene oxide per mole of amine respectively. "Propomeen 0/12" is the condensation product of one mole of oleyl amine with 2 moles propylene oxide. Preferably, the salt is formed from Ethomeen C/15 or S/15 or mixtures thereof.

Commercially available examples of hydroxyamines where h is one include "Ethoduomeen T/13" and "T/20" which are ethylene oxide condensation products of N-tallow trimethylene diamine containing 3 and 10 moles of ethylene oxide per mole of diamine, respectively.

The fatty polyamine diamines include mono- or dialkyl, symmetrical or asymmetrical ethylene diamines, propane diamines (1, 2, or 1, 3), and polyamine analogs of the above. Suitable commercial fatty polyamines are "Duomeen C" (N-coco-1,3-diaminopropane), "Duomeen S" (N-soya-1,3-diaminopropane), "Duomeen T" (N-tallow-1,3diaminopropane), or "Duomeen O" (N-oleyl-1,3-diaminopropane). "Duomeens" are commercially available diamines described in Product Data Bulletin No. 7-10R1 of Armak Chemical Co., Chicago, Ill. In another embodiment, the secondary amines may be cyclic amines such as piperidine, piperazine, morpholine, etc.

The metal salt of reaction product (A) may be prepared from an alkali metal, alkaline earth metal or transition metal compound, preferably an alkali metal or an alkaline earth metal compound, more preferably an alkali metal compound. Specific examples of metal compounds include sodium, potassium, calcium, magnesium, zinc or aluminum cation, more preferably, a sodium or potassium cation. The metal compounds are formed by treating the reaction product with a metal oxide, hydroxide, or halide. The metal salt is formed between room temperature and about 1200° C., more preferably room temperature to about 800° C.

The following examples relate to reaction products (A) of the present invention. Unless otherwise indicated in the examples and elsewhere in the specification and claims, temperature is in degrees Celsius, parts are parts by weight and pressure is atmospheric.

EXAMPLE 1

A reaction vessel is charged with 3503 parts (0.58 mole) of Jeffamine ® ED-6000 (a diamine from Texaco Chemical Co. having an average molecular weight of 6000 and being a primary amine-terminated propylene oxide capped polyoxyethylene) and 497 parts (0.58 mole) of Unidyme ® 60 (a trimer acid available commercially from Union Camp Corporation having 754 trimer acid, 254 dimer acid and derived from $C_{18}$ monomeric acids). The mixture is stirred and heated to 1500°-220C. for four hours, while distillate (9.2 milli-liters) is removed. The residue has a neutralization number of 7.5.

EXAMPLE 2

A reaction vessel is charged with 2400 parts (1.2 moles) of Jeffamine ® ED-2001 and 1611 parts (1.89 moles) of Unidyme ® 60. The mixture is stirred and heated to 150°-200° C. for 3.7 hours, while distillate (33 milliliters) is removed. The residue has a neutralization number of 42.

EXAMPLE 3

A reaction vessel is charged with 3660 parts (0.61 mole) of Jeffamine ® ED-6000, 260 parts (0.31 mole) of Unidyme ® 60 and 202 parts (0.6 mole) of a hexadecenyl succinic anhydride available from Dixie Chemical. The mixture is heated to 1600°-205° C. for four hours while 9.0 milliliters of distillate is removed. A 50% aqueous solution of sodium hydroxide (77 parts, 0.58 mole) is added to the mixture. The mixture has a neutralization number of 12.

EXAMPLE 4

A reaction vessel is charged with 3000 parts (1 equivalent) of Jeffamine ® ED-6000, 412 parts (2 equivalents) of a dimer acid (commercially available from Westvaco Corporation under the tradename Westvaco dimer acid 1550). The mixture is heated under nitrogen to 154° C. in 40 minutes. The reaction is maintained between 150° and 200° C. for four hours while 8.5 milliliters of distillate are collected. The reaction mixture is cooled to 120° C. and the reaction temperature is maintained for 1.5 hours while 1.1 milliliters of distillate is collected. The reaction temperature is increased to 200° C. while 0.1 milliliter of distillate is removed. The residue has a neutralization number of 16.5.

EXAMPLE 5

(a) 2960 parts of $C_{16}$ alpha-olefin and 100 parts of Amberlyst 15 (a product of Rohm & Haas Company identified as a cation exchange resin) are added to a five-liter flask equipped with a nitrogen sparge (2.0 standard cubic feet per hour), stirrer, thermowell and water trap positioned below a condenser. The mixture is heated to 120° C. for 1.5 hours with the stirrer operating at 350 rpm. The filtrate is the desired product.

(b) Maleic anhydride (367.5 parts) are added to a two-liter flask equipped with stirrer, thermowell, reflux condenser and gas inlet tube. The maleic anhydride is melted and 765 parts of the product from (a) are added. The mixture is heated to 180°-200° C. for 9.75 hours. The mixture is stripped under a vacuum of 30 mm. Hg. at 182° C., then cooled to 115° C. The mixture is then stripped under vacuum of 0.7 mm. Hg. at 145° C., then cooled to 50° C. The mixture is filtered with diatomaceous earth. The filtrate is the desired product.

(c) One hundred parts of Jeffamine ® ED-6000 and 10.8 parts of the product from (b) are mixed together, heated at a temperature of 130° C. for three hours, and then cooled to room temperature to provide the desired product.

EXAMPLE 6

A reaction vessel is charged with 2225 parts, 0.37 mole, of Jeffamine ® ED-6000, and 241 parts, 0.75 mole of hexadecenyl succinic anhydride. The mixture is heated to 130° C. and is held for three hours. The reaction mixture is cooled to 100° C. and 2466 parts of distilled water is added over one-fourth hour. A 50% sodium hydroxide solution (60 parts, 0.75 mole) is added to the mixture and the mixture is stirred for one-half hour. A 50% aqueous solution of sodium mercaptobenzothiazole is added to the mixture and the mixture is stirred for one-half hour. The product has a neutralization number of 17.3.

EXAMPLE 7

A reaction product is prepared as described in Example 6 using 2600 parts (0.43 mole) of Jeffamine ® ED-6000, 603 parts (0.7 mole) of Unidyme ® 60 and 56 parts (0.8 mole) of a 50% aqueous solution of sodium hydroxide. The mixture has a final neutralization number of 25.5.

EXAMPLES 8-12

The following Table 1 contains examples which are prepared by the procedure described in Example 1.

TABLE 1

| Example | Amine-terminated Polyoxyalkylene (parts) | Acylating Agent (parts) |
| --- | --- | --- |
| Ex. 8 | 900 Jeffamine ® ED-900 | 857 Unidyme ® 60 |
| Ex. 9 | 4000 Jeffamine ® ED-4000 | 504 hexadecenyl succinic anhydride |
| Ex. 10 | 2005 Jeffamine ® M-2005 | 412 Westvaco dimer acid (see Ex. 4) |
| Ex. 11 | 5000 Jeffamine ® T-5000 | 857 Unidyme ® 60 |
| Ex. 12 | 2005 Jeffamine ® M-205 | 571 Unidyme ® 60 |

EXAMPLES 13-16

Examples 12-15 are prepared by the procedure described in Example 6, except there is no addition of a 50% aqueous solution of sodium mercaptobenzothiazole.

TABLE 2

| Example | Product of (parts) | Base (parts) |
| --- | --- | --- |
| Ex. 13 | 100 Ex. 1 | 1 Sodium hydroxide (50% aqueous solution) |
| Ex. 14 | 100 Ex. 2 | 3.5 potassium hydroxide |
| Ex. 15 | 100 Ex. 3 | 3 triethanolamine |
| Ex. 16 | 100 Ex. 10 | 3 Ethomeen ® C/15 |

(C) Surfactants

The acylated amine-terminated polyoxyalkylenes, i.e. reaction product (A), may be used alone or in combination with (B) a surfactant. The combination of the acylated amine-terminated polyoxyalkylene and a surfactant gives improved thickening, wetting and emulsifying properties to fluids. The combination usually contains from about 5%, preferably from about 15%, more preferably from about 25%, more preferably from about 50% to about 95%, preferably to about 85%, more preferably to about 75% of the acylated amine-terminated polyoxyalkylene. The combination usually contains from about 5%, preferably from about 10%, more preferably from about 20% to about 90%, preferably to about 75%, more preferably to about 50% by weight of the surfactant. The surfactants include nonionic, cationic and anionic surfactants. The surfactants include polyoxyalkylene amines, polyoxyalkylene amides, polyoxyalkylene alcohols, polyoxyalkylene esters, and fatty acid salts or mixtures of these surfactants. Any of the above described polyoxyalkylene amines, including the above-described amine-terminated polyoxyalkylenes and hydroxyamines (Ethomeens, Ethoduomeens, etc.), may be used as surfactants in the present invention.

The polyoxyalkylene glycols may be polyoxyethylene glycols or polyoxypropylene glycols. Useful polyoxyethylene glycols are available from Union Carbide under the trade name Carbowax ® PEG 300, 600, 1000 and 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide under the trade name NIAX 425; and NIAX 1025. Useful polyoxypropylene glycols are available from Dow Chemical and sold by the trade name PPG-1200, and PPG-2000.

Representative of other useful polyoxyalkylene polyols are the liquid polyols available from Wyandotte Chemicals Company under the name PLURONIC Polyols and other similar polyols. These PLURONIC Polyols correspond to the formula

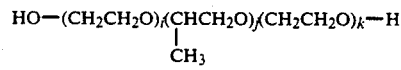

wherein i, j, and k are integers greater than 1 such that the —$CH_2CH_2O$— groups comprise from about 10% to about 15% by weight of the total number average molecular weight of the glycol, the number average molecular weight of said polyols being from about 2500 to about 4500. This type of polyol can be prepared by reacting propylene glycol with propylene oxide and then with ethylene oxide. A particularly useful I polyoxyalkylene polyol is Pluracol ® V-10 which is a polyoxyalkylene derivative of trimethylol propane having a molecular weight of 22,000. This material is available commercially from BASF Corporation, Parsippany, N.J., U.S.A.

In another embodiment the surfactant is an alkyl-terminated polyoxyalkylene. A variety of alkyl-terminated polyoxyalkylenes are known in the art, and many are available commercially. The alkyl-terminated polyoxyalkylenes are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol.

The alkyl-terminated polyoxyalkylene polyols useful in the present invention are available commercially under such trade names as "TRITON ®" from Rohm & Haas Company, "Carbowax ®" and "TERGITOL ®" from Union Carbide, "ALFONIC ®" from Conoco Chemicals Company, and "NEODOL ®" from Shell Chemical Company. The TRITON ® materials are identified generally as polyethoxylated alcohols or phenols. The TERGITOLS ® are identified as polyethylene glycol ethers of primary or secondary alcohols; the ALFONIC ® materials are identified as ethoxylated linear alcohols which may be represented by the general structural formula

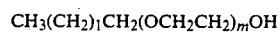

wherein 1 varies between 4 and 16 and m is a number between about 3 and 11. Specific examples of ALFONIC ® ethoxylates characterized by the above formula include ALFONIC® 1012-60 wherein 1 is about 8 to 10 and m is an average of about 5 to 6; ALFONIC® 1214-70 wherein 1 is about 10–12 and m is an average of about 10 to about 11; ALFONIC® 1412-60 wherein 1 is from 10–12 and m is an average of about 7; and ALFONIC® 1218-70 wherein 1 is about 10–16 and m is an average of about 10 to about 11.

The Carbowax® methoxy polyethylene glycols are linear ethoxylated polymer of methanol. Examples of these materials include Carbowax® methoxy polyethylene glycol 350, 550 and 750, wherein the numerical value approximates number average molecular weight.

The NEODOL® ethoxylates are ethoxylated alcohols wherein the alcohols are a mixture of alcohols containing from 12 to about 15 carbon atoms, and the alcohols are partially branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23–6.5 is a partially branched chain alcoholate of 12 to 13 carbon atoms with an average of about 6 to about 7 ethoxy units.

Another group of polyols are the commercially available liquid TETRONIC polyols sold by Wyandotte Chemicals Corporation. These polyols are represented by the general formula:

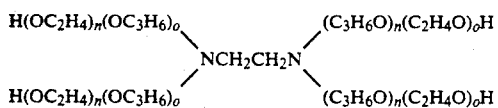

Such hydroxyamines are described in U.S. Pat. No. 2,979,528 which is incorporated herein by reference. Those hydroxyamines corresponding to the above formula having a number average molecular weight of up to about 10,000 wherein the ethyleneoxy groups contribute to the total number average molecular weight in the percentage ranges discussed above are preferred. A specific example would be such a hydroxyamine having a number average molecular weight of about 8000 wherein the ethyleneoxy groups account for 7.5%–12% by weight of the total number average molecular weight. Such hydroxyamines can be prepared by reacting an alkylene diamine such as ethylene diamine, propylene diamine, hexamethylene diamine etc., with propylene oxide. Then the resulting product is reacted with ethylene oxide.

In another embodiment, the surfactant is a propoxylated hydrazine. Propoxylated hydrazines are available commercially under the tradename Qxypruf™. Examples of propoxylated hydrazines include Qxypruf™ 6, 12 and 20 which are hydrazine treated with 6, 12 and 20 moles of propylene oxide, respectively.

In another embodiment, the surfactant is a polyoxyalkylated phenol. The phenol may be substituted or unsubstituted. A preferred polyoxyalkylated phenol is a polyoxyethylate nonylphenol. Polyoxyalkylated phenols are availabe commercially from Rohm and Haas Co. under the tradename Triton® and Texaco Chemical Company under the tradename Surfonic®. Examples of polyoxyalkylated phenols la include Triton® AG-98, N series, and X series polyoxyethylated nonylphenols.

In another embodiment, the surfactant is a polyoxyalkylene fatty ester. Polyoxyalkylene fatty esters may be prepared from any polyoxyalkylene polyol and a fatty acid. Preferably, the polyoxyalkylene polyol is any disclosed herein. The fatty acid is preferably the fatty monocarboxylic acid described above. Polyoxyalkylene fatty esters are available commercially from Armak Company under the tradename Ethofat™. Specific examples of polyoxyalkylene fatty esters include Ethofat™ C/15 and C/25, which are coco fatty esters formed using 5 and 15 moles, respectively, of ethylene oxide; Ethofat™ O/15 and O/20, which are oleic esters formed using 5 and 10 moles of ethylene oxide; and Ethofat 60/15, 60/20 and 60/25 which are stearic esters formed with 5, 10 and 15 moles of ethylene oxide respectively.

In another embodiment, the surfactant is a polyoxyalkylated fatty amide. Preferably the fatty amide is polyoxypropylated or polyoxyethylated, more preferably polyoxyethylated. Examples of fatty acids which may be polyoxyalkylated include oleylamide, stearylamide, tallowamide, soyaamide, cocoamide, and laurylamide. Polyoxyalkylated fatty amides are available commercially from Armak Company under the trade name Ethomid™ and Lonza, Inc., under the tradename Unamide®. Specific examples of these polyoxyalkylated fatty amides include Ethomid™ HT/15 and HT/60, which are hydrogenated tallow acid amides treated with 5 and 50 moles of ethylene oxide respectively; Ethomid™ O/15, which is an oleic amide treated with 5 moles of ethylene oxide; Unamide® C-2 and C-5, which are cocamides treated with 2 and 5 moles of ethylene oxide, respectively; and Unamide® L-2 and L-5, which are lauramides treated with 2 and 5 moles of ethylene oxide, respectively.

In a preferred embodiment, the surfactant is a tall oil, such as distilled tall oil available from Union Camp under the tradename Unitol.

In another embodiment, the surfactant is a nitrogen-containing phosphorus-free reaction product of a carboxylic acylating agent, preferably a succinic acylating agent, having at least one hydrocarbyl group from at least about 12, preferably from about 30, more preferably from about 35 to about 500, preferably to about 300 carbon atoms with at least one N-(hydroxyhydrocarbyl) amine. In one embodiment, the hydrocarbyl group is derived from a polyalkene having a number average molecular weight from about 500, preferably from about 800 to about 5000, preferably to about 2500, more preferably to about 1200. Number average molecular weight is determined by gel permeation chromatography. The polyalkene is derived from olefins having from about two to about eight carbon atoms, such as ethylene, propylene or butylene, preferably butylene. The amine may be a monoamine, polyamine or mixtures thereof. The carboxylic acid acylating agents have been described above as well as the hydroxyamines.

Particularly useful hydroxyhydrocarbyl amines include mono, di and triethanolamine, diethyl ethanolamine, di(3-hydroxypropyl)amine, N-(3-hydroxylbutyl) amine, N-(4-hydroxyl-butyl)amine, N,N-di(2-hydroxylpropyl) amine, N-(2-hydroxylethyl) morpholine and its thionalogue, N-(2-hydroxyl-ethyl)cyclohexyl amine, N-3-hydroxylcyclopenthyl amine, 0,M-NP-aminophenol, N-(hydroxylethyl) piperazine, N,N'-di(hydroxyethyl)piperazine, and the like. Preferred amines are diethylethanolamine and ethanolamine or mixtures thereof.

Often the reaction is carried out under ester forming conditions and the product thus formed is an ester/salt.

Preferably, the ester/salt is an internal salt, wherein one of the hydroxyl groups of the carboxylic acylating agents becomes ionically bonded to a nitrogen atom within the same group or may be an external salt wherein the ionic salt group is formed with a nitrogen atom which is not part of the same group forming the ester. Generally, the reaction is carried out at a temperature in the range of about 50° C. to about 150° C.; but usually at a temperature below a 100° C.

The reaction products made by reacting a carboxylic acylating agent and a hydroxyl amine which are useful surfactants are described in U.S. Pat. Nos. 4,329,249; 4,368,133; 4,435,297; 4,447,348; and 4,448,703. These patents are incorporated by reference for their disclosure to the reaction products of carboxylic acylating agents and hydroxyamines as well as methods for making the same.

The following example relates to ester/salts which may be used in the present invention.

EXAMPLE 17

A reaction vessel is charged with 1000 parts of polybutene (number average molecular weight equals 950) substituted succinic anhydride. The anhydride is heated to about 90° C. over two hours where 209 parts of N,N-diethylethanolamine is added to the vessel. The reaction temperature is maintained at 90° C. for an additional hour. The mixture is cooled to room temperature to provide the desired product.

Drilling Fluid

The reaction products (A) of the present invention are used together with a water based drilling fluid. The drilling fluid or mud is generally composed of water, a clay, and a density increasing agent. Agents which increase density of drilling muds include galena (PbS), hematite ($Fe_2O_3$) magnetite ($Fe_3O_4$) ilmenite ($FeOTiO_2$) barite ($BaSO_4$), siderite ($FeCO_3$) I celesite ($SrSO_4$), dolomite ($CaCO_3.MgCO_3$), and calcite ($CaCO_3$). Density increasing agents may also be soluble salts such as sodium chloride, sodium bromide, sodium carbonate, potassium chloride, potassium carbonate, calcium bromide, zinc chloride, and zinc bromide. The drilling fluid or mud may also contain commercial clays. These clays include bentonite, attapulgite, sepiolite, etc. The preferred clay is bentonite.

The drilling fluid may additionally contain other additives which enhance the lubricating properties of drilling fluids and mud. See, for example, U.S. Pat. Nos. 3,214,374 and 4,064,055. These patents are hereby incorporated by reference for their disclosure of drilling fluids and muds, including other additives which may enhance lubricating properties of the fluids and muds.

The acylated amine terminated polyoxyalkylene may be used alone or in combination with one or more of the above-described surfactants. The acylated amine-terminated polyoxyalkylene is generally added to the drilling fluid or mud as a concentrate. Typically, the concentrates contain at least about 30% by weight of the total composition, preferably at least about 35%. In one embodiment, the concentrates contain from about 30%, preferably from about 40% to about 80%, preferably to about 70% by weight of acylated amine-terminated polyoxyalkylenes based on the total weight of the concentrate. The concentrate may contain only the acylated amine-terminated polyoxyalkylene or may additionally contain one or more of the abovedescribed surfactants.

When used in a drilling fluid, the concentrates are generally added to the drilling fluid at a level of about 0.5% to about 15% by weight concentrate in the drilling fluid. Typically, the concentrates are used from about 0.5% to about 5%, preferably 2% by weight of the drilling fluid. The acylated amines are generally present in an amount from about 0.15%, preferably from about 0.25% to about 3%, preferably to about 1% by weight of the drilling fluid.

The following examples relate to drilling muds which may be used in the present invention.

EXAMPLE I

A potassium chloride-polymer drilling mud is prepared by mixing 350 parts of water with 12 parts potassium chloride, 8 parts prehydrated bentonite, 1 part starch, 0.5 part of a polyacrylamide (Poly-Plus available from MI Drilling Fluids, Houston, Texas), 0.5 part potassium hydroxide, 200 parts of barite and 12 parts of the product of Example 1.

EXAMPLE II

A sea water/lignosulfonate drilling mud is prepared by mixing 350 parts of water with 20 parts attapulgite, 15 parts sea salt, 3 parts lignosulfonate, 4 parts cellulose (potato starch), 200 parts barite, 0.05 parts defoamer (Sur Tech H-49) and 9 parts of the product of Example 2.

EXAMPLE III

A fresh water gelled drilling mud is prepared by mixing 350 parts of water, 15 parts prehydrated bentonite, 5 parts drill solids (Rev Dust), 0.5 part cellulose (potato starch), 0.15 part lime, 0.25 part sodium hydroxide, 0.25 part soda ash, 15 parts barite and 9.5 parts of the product of Example 3.

EXAMPLE IV

A lignosulfonate/fresh water drilling mud is prepared by mixing 350 parts of water, 25 parts prehydrated bentonite, 15 parts drill solids (Rev dust), 0.5 part cellulose (potato starch), 5 parts chrome ligno sulfonate, 2.5 parts lignite, 0.25 part lime, 1 part sodium hydroxide, 0.25 part sodium carbonate, 200 parts barite and 12 parts of the product of Example 4.

EXAMPLE V

A drilling mud is prepared as described in Example I except 18 parts of the product of Example 6 are used in place of 12 parts of the product of Example 1.

EXAMPLE VI

A salt water/ligno sulfonate drilling mud is prepared as described in Example II, except nine parts of the product of Example 9 are used in place of nine parts of the product of Example 2.

EXAMPLE VII

A fresh water gelled drilling mud is prepared as described in Example III, except 15 parts of the product of Example 10 are used in place of 9.5 parts of the product of Example 3.

EXAMPLE VIII

A lignosulfonate/fresh water drilling mud is prepared as described in Example IV except 12 parts of the product of Example 11 are used in place of 12 parts of the product of Example 4.

EXAMPLE IX

A salt water/lignosulfonate drilling mud is do prepared as described in Example II except 10 parts of the product of Example 14 are used in place of 9 parts of the product of Example 2.

EXAMPLE X

A lignosulfonate/fresh water drilling mud is prepared as described in Example IV, except 12 parts of the product of Example 15 are used in place of 12 parts of the product of Example 4.

Spotting Fluid

The acylated amine-terminated polyoxyalkylene may be used alone as a spotting fluid. Such a fluid would be pumped down a well borehole in quantities greater than that required for a lubricant. The spotting fluid acts to dislodge previously lodged drill string or pipe. Typically, the fluids used as spotting fluids are mineral oils and vegetable oils which are toxic to marine life. The present acylated amine-terminated polyoxyalkylenes do not adversely affect marine life.

The acylated amine-terminated polyoxyalkylenes as already described may be used alone or in combination with any one or more of the above-described surfactants. The spotting fluids are generally prepared as concentrates (described above) which are then diluted with water at drilling sites. The concentrates are generally diluted with water at a level of about 0.5% to about 15% concentrate in water. The water may be fresh or salt water. Typically, the concentrate is used from about 1%, preferably from about 3% to about 104, preferably to about 7%, usually to about 5% by weight concentrate in water. The following Table 3 contains spotting fluid concentrates. Spotting fluids may be prepared from these concentrations by mixing 5% of the concentrate in fresh or salt water.

of spotting fluid. The apparatus also uses a bevelled torque plate (Exxon designed torque plate) to establish the height of the filter cake. Modifications of the apparatus are made by Core Laboratories, Lafayette, La. U.S.A. The general procedure involves placing a filter paper and ring attachment in the sticking cell. Approximately 80 milliliters of drilling fluid is poured into the cell. The top of the cell is screwed on and tightened then a yoke attachment is placed on the cell and the desired plate height (cake thickness) is set to 1/64 inch. The cell is pressurized with nitrogen to 500 psi. Filtrate is collected on the filter paper and the plate is allowed to stick. Spotting fluid is added to the cell. To insure the spotting fluid reaches the mud cake, the cell is inverted and rocked back and forth several times. Any air contained in the cell is bled off. The cell remains inverted after spotting. The time for the cake to unstick is measured. The products are tested at a concentration of 5% by weight in sea water.

The 96 hour shrimp test is performed on a drilling fluid containing 5% by volume of the spotting fluid. The drilling fluid has a pH of 8.46. The drilling fluid is thoroughly homogenized for 30 minutes with a high shear mixer. The homogenized material is then combined with artificial sea water (salinity equals 20 parts per 1000) in a 1:9 ratio by volume. The drilling fluid-sea water mixture, characterized by a pH of 7.99, is mixed for five minutes and is allowed to settle for one hour. During the five minute mixing period, the pH is adjusted with 0.05 milliliter of 6 normal hydrochloric acid to about pH 7.8. Following the settling period, the suspended particulate phase is decanted.

Mysids (*Mysidoysis bahia*) used as test organisms are 3-6 days old. The animals are cultured in Core Laboratories Bioassay facilities using brood stock originally purchased from a commercial supplier. The test is conducted at 20° C. using artificial sea water (Hawaiian Marine Mix) adjusted to salinity of 20 parts per 1000.

TABLE 3

|  | SP-1 | SP-2 | SP-3 | SP-4 | SP-5 | SP-6 | SP-7 | SP-8 | SP-9 | SP-10 |
|---|---|---|---|---|---|---|---|---|---|---|
| Product of Ex. 1 | 80 | | | | | | | | | |
| Product of Ex. 3 | | 50 | | | | | | | | |
| Product of Ex. 4 | | | 60 | 10 | | | | | | |
| Product of Ex. 5 | | | | | 70 | | | | | |
| Product of Ex. 6 | | | 50 | | | 39.5 | | | | 49.5 |
| Product of Ex. 9 | | | | | | | 60 | | | |
| Product of Ex. 14 | | | | | | | | 70 | | |
| Product of Ex. 15 | | | | | | | | | 65 | |
| Product of Ex. 16 | | | | | | | 30 | | 15 | |
| Alfonic 10, 12-60 | | | | 10 | | | | | | |
| Carbowax ® 300 | | | | 20 | | | | | | 50 |
| Ethomeen ® S/15 | | 25 | | | | | | | | |
| Niax 1025 | | | | 10 | | | | | | |
| Pluracol V-10 | | | | | | 40 | | | | |
| Unamide ® C-5 | | | 10 | | | | | | | |
| Unitol DT-40 | | | | | 10 | | | | | |
| Water | 20 | 25 | 20 | 10 | 20 | 20.5 | 10 | 15 | 20 | 0.5 |

The sticking test measures the time necessary for the spotting fluid to unstick a plate. The examples in Table 1 are tested using a base mud containing 22 pounds per barrel of bentonite (Aquagel) and 30 pounds per barrel of Martin No. 5 bulk clay which is mixed with water. This mixture is statically aged for 72 hours. Lignosulfonate (Q-broxin) is then added and caustic soda (sodium hydroxide) is added until the pH is about 10. Sticking tests are run using a Baroid differential sticking tester apparatus (No. 21150) available from Baroid Co., Houston, Tex. U.S.A. The apparatus has been modified by drilling two holes in the cell to allow entrance and exit Mysids are fed approximately 50 live artemia sp (brine shrimp) per test animal every 24 hours.

Tests are conducted with five concentrations of suspended particulate phase and a control (of sea water only) with ten Mysids randomly distributed among each concentration. Tests are performed in crystallizing dishes which contain one liter of test solution. Filtered artificial sea water with a salinity of 20 parts per 1000 is used to dilute the suspended particulate phase to test concentrations and as the control solution. A 14 hour light and 10 hour dark photo period is maintained with cool, white flourescent lights. Air is supplied to the test chambers by a commercial aqua culture blower and delivered through glass tubing at a rate of between 50 and 140 cubic centimeters per minute. At a minimum, the number of survivors are determined at 0 and 96 hours. Ninety percent or greater survival occurred in the control exposure.

The 96 hour reference toxicant test (sodium lauryl sulfate, for this bio essay) is performed according to US EPA protocol. The sodium lauryl sulfate is obtained from Aldrich Chemical Co. and is from their lot no. 15K-R-4G. The $LC_{50}$ obtained with this most recent sodium lauryl sulfate reference test is 11.5 parts per million sodium lauryl sulfate with 95% confidence level of 10.2 parts per million to 12.9 parts per million.

The following table contains results of tests performed in the stickometer test and the 96 hour shrimp test.

TABLE 4

| Composition of Example (at 5% wt. in sea water) | Sticking Test | 96 Hour Shrimp Test (ppm SPP (1) |
|---|---|---|
| Sp-6 | 1 hr/10 min 3 hr/51 min | 1,000,000 |
| Sp-10 | 2 hr/39 min 11 hr/28 min | 1,000,000 |

(1) Suspended Particulate Phase.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method, comprising the steps of:
introducing into a well borehole a composition, comprising water and an amount, sufficient to reduce drilling torque, prevent sticking or twisting of a pipe during drilling, or release a stuck pipe in a well borehole, of (A) at least one reaction product of (A-1) at least one hydrocarbyl-substituted carboxylic acylating agent selected from the group consisting of a succinic acylating agent, a Diels-Alder diacid, a dimer acylating agent, a tricarboxylic acylating agent, and mixtures thereof, and (A-2) at least one amine-terminated polyoxyalkylene having a number average molecular weight from about 600 to about 10,000, or at least one salt of the reaction product, and
drilling the well borehole.

2. The method of claim 1, wherein the hydrocarbyl group of (A-1) contains an average of about 8 to about 40 carbon atoms.

3. The method of claim 1, wherein the carboxylic acylating agent (A-1) is an alkenylsuccinic acid or anhydride having an average of about 12 to about 28 carbon atoms in the alkenyl group.

4. The method of claim 1, wherein the carboxylic acylating agent (A-1) is a dimer acid having an average of about 18 to about 44 carbon atoms.

5. The method of claim 1, wherein the carboxylic acylating agent (A-1) is a trimer acid containing an average of about 18 to about 66 carbon atoms.

6. The method of claim 1, wherein the amine-terminated polyoxyalkylene (A-2) has a number average molecular weight from about 3,000 to about 7,000.

7. The method of claim 1, wherein the amine-terminated polyoxyalkylene (A-2) is represented by the formulae:

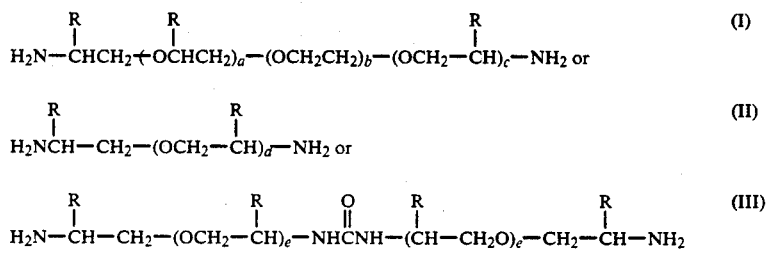

wherein R is an alkyl group having from 1 to about 8 carbon atoms, a is an average number in the range from 0 to about 200, b is an average number in the range from about 10 to about 650, c is an average number in the range from 0 to about 200, d is an average number in the range from about 1 to about 150, and e is a number sufficient to provide the compound with a number average molecular weight of at least about 600.

8. The method of claim 1, wherein the salt of the reaction product is derived from ammonia, at least one amine, at least one metal or mixtures thereof.

9. The method of claim 1, wherein the salt of the reaction product is an alkali or alkaline earth metal salt.

10. The method of claim 1, wherein the reaction product is a sodium or potassium salt.

11. The method of claim 1, wherein the composition further comprises (B) at least one polyoxyalkylene amine, polyoxyalkylene alcohol, polyoxyalkylene phenol, polyoxyalkylene ether, polyoxyalkylene ester, or fatty acid or salt thereof.

12. The method of claim 11, wherein the surfactant (B) is a polyoxyalkylene polyol.

13. The method of claim 1, wherein the composition further comprises a clay.

14. The method of claim 13, wherein the clay is bentonite.

15. The method of claim 1, wherein the reaction product (A) is present in an amount from about 0.5% to about 20% by weight of the composition.

16. A method, comprising the steps of:
introducing into a well borehole composition comprising water and from about 0.5% to about 20% by weight of the composition (A) at least one reaction product of (A-1) at least one hydrocarbyl-substituted carboxylic acylating agent selected from the group consisting of a succinic acylating agent, a Diels-Alder diacid, a dimer acylating agent, a tricarboxylic acylating agent, and mixtures thereof, and (A-2) at least one amine-terminate polyoxyalkylene having a number average molecular weight from about 3000 to about 10,000 or at least one salt of the reaction product, and drilling the well borehole.

17. The method of claim 16, wherein the carboxylic acylating agent (A-1) is an alkenylsuccinic acid or anhydride having an average of about 12 to about 28 carbon atoms in the alkenyl group.

18. The method of claim 16, wherein the carboxylic acylating agent (A-1) is a trimer acid containing an average of about 18 to about 66 carbon atoms.

19. The method of claim 16, wherein the amine-terminated polyoxyalkylene (A-2) has a number average molecular weight from about 3000 up to about 7000.

20. The method of claim 16, wherein (A) the reaction product is a salt derived from ammonia, at least one amine, at least one metal or mixtures thereof.

21. The method of claim 16, wherein the salt of the reaction product is an alkali or alkaline earth metal salt.

22. The method of claim 16, wherein the salt of the reaction product is a sodium or potassium salt.

23. The method of claim 16, wherein the composition further comprises (B) at least one polyoxyalkylene amine, polyoxyalkylene alcohol, polyoxyalkylene phenol, polyoxyalkylene ether, polyoxyalkylene ester, or fatty acid or salt thereof.

24. A drilling fluid, comprising water, a clay, a density increasing agent, and (A) at least one reaction product of (A-1) at least one hydrocarbyl substituted carboxylic acylating agent selected from the group consisting of a succinic acylating agent, a Diels-Alder diacid, a dimer acylating agent, a tricarboxylic acylating agent, and mixtures thereof, wherein the acylating agents contain an average of about eight to about 40 carbon atoms, and (A-2) at least one amine-terminated polyoxyalkylene having a number average molecular weight from about 600 to about 10,000 or at least one salt of the reaction product.

25. The composition of claim 24, wherein the carboxylic acylating agent (A-1) is an alkenyl succinic acid or anhydride having an average of about 12 to about 28 carbon atoms in the alkenyl group.

26. The composition of claim 24, wherein the carboxylic acylating agent (A-1) is a trimer acid containing an average of about 18 to about 66 carbon atoms.

27. The composition of claim 24, wherein the amine-terminated polyoxyalkylene (A-2) has a number average molecular weight from about 3000 to about 7000.

28. The composition of claim 24, wherein the fluid further comprises (b) at least one polyoxyalkylene amine, polyoxyalkylene alcohol, polyoxyalkylene phenol, polyoxyalkylene ether, polyoxyalkylene ester, or fatty acid or salt thereof.

* * * * *